United States Patent [19]

Seggio

[11] 4,391,316

[45] Jul. 5, 1983

[54] ANTI-SKID DEVICE FOR VEHICLE WHEELS

[76] Inventor: Gianfranco Seggio, Via Tracia 7, Milan, Italy

[21] Appl. No.: 302,770

[22] Filed: Sep. 16, 1981

[30] Foreign Application Priority Data

Sep. 17, 1980 [IT] Italy .............................. 22768/80[U]

[51] Int. Cl.³ .......................................... B60C 27/00
[52] U.S. Cl. ............................... 152/213 A; 152/219; 152/221; 152/225 C; 152/228
[58] Field of Search ............... 152/208, 213 R, 213 A, 152/214, 216, 221, 222, 225 R, 225 C, 220, 226–230, 219; 238/14; 24/219, 220

[56] References Cited

U.S. PATENT DOCUMENTS

| | | | |
|---|---|---|---|
| 1,295,294 | 2/1919 | Fink | 152/228 |
| 2,580,272 | 12/1951 | Bell | 152/221 |
| 2,640,522 | 6/1953 | Schroen | 152/228 |
| 2,770,280 | 11/1956 | Fries et al. | 152/216 |
| 4,244,412 | 1/1981 | Seggio | 152/225 C |

FOREIGN PATENT DOCUMENTS 2421745 11/1979 France .
122221 11/1927 Switzerland .

Primary Examiner—Jerome W. Massie
Assistant Examiner—Thomas Bokan
Attorney, Agent, or Firm—Lerner, David, Littenberg & Krumholz

[57] ABSTRACT

The invention relates to an anti-skid device for vehicle wheels, comprising a plurality of U-shaped elements radially mounted on the wheel tire, and two series of connecting levers pivoted on each arm of said U-shaped elements. In order to provide an automatic mounting operation of the device on a vehicle wheel by simply advancing the wheel on the device, each arm of each of the U-shaped elements carries retaining means for said levers, which removably retain the U-shaped elements and levers in a relative position wherein each of said U-shaped elements forms a pre-set angle with the levers adjacent to the same, said angle corresponding to that formed when the device is mounted on the tire.

10 Claims, 9 Drawing Figures

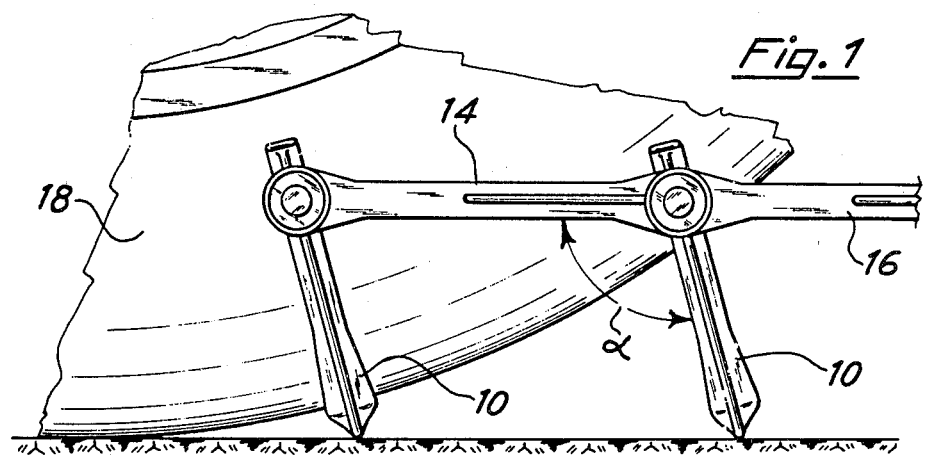
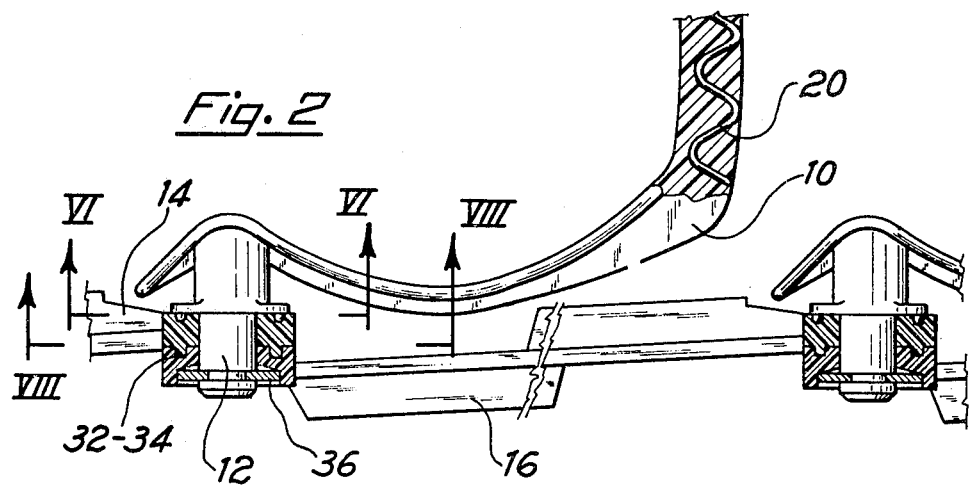
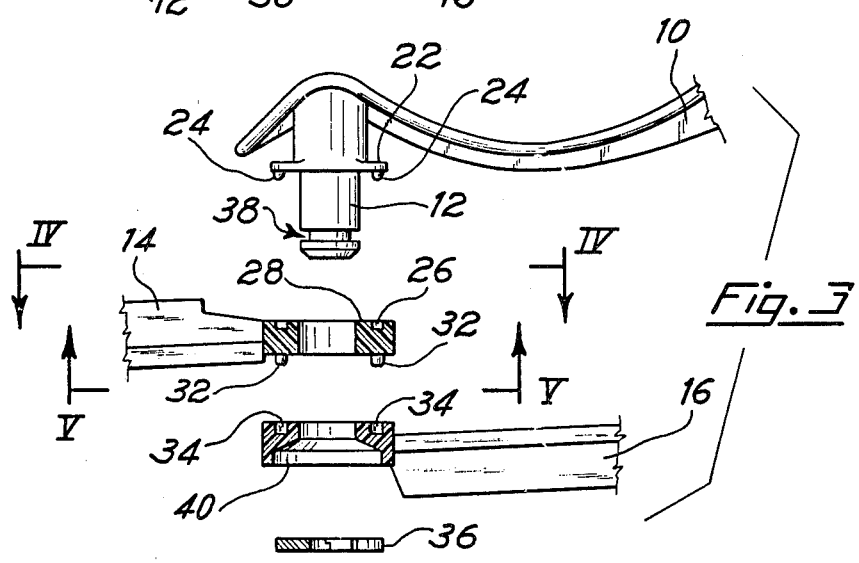

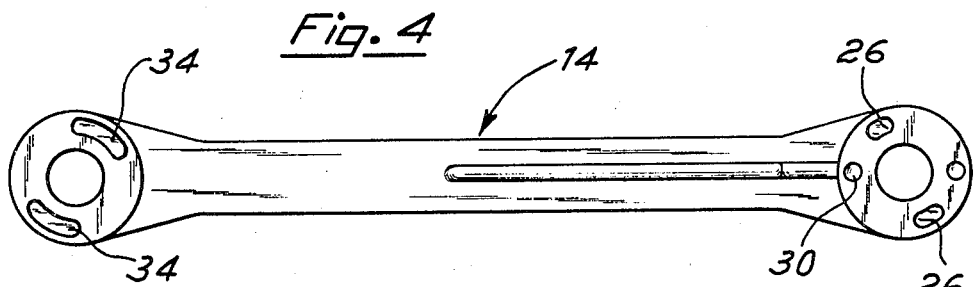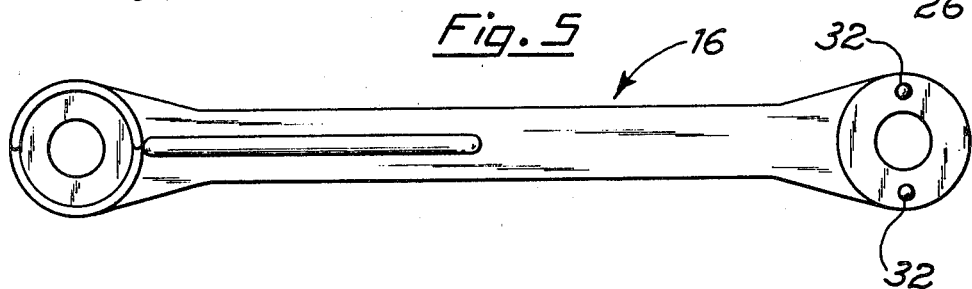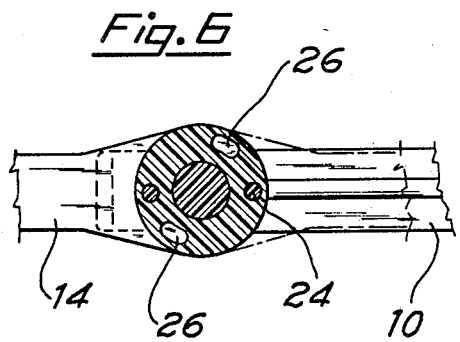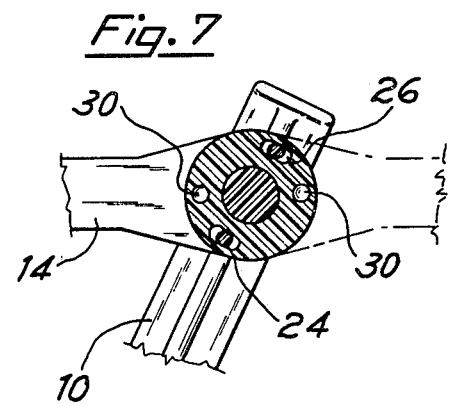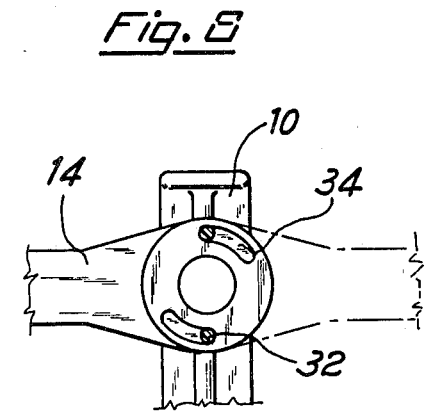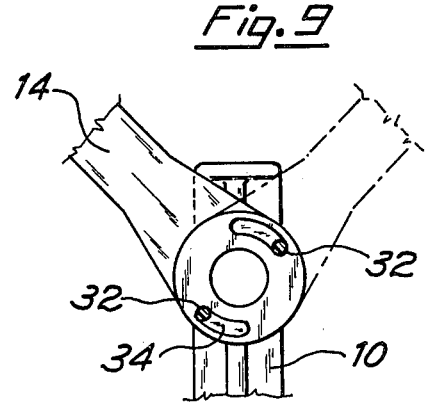

ANTI-SKID DEVICE FOR VEHICLE WHEELS

BACKGROUND OF THE INVENTION

This invention relates to an anti-skid device or skid-chain for vehicle wheels, particularly of the type realize to former proposals of the same Applicant (see for instance USP 4,244,412) and essentially formed by a plurality of components of plastic material, namely a plurality of U-shaped elements, adapted to be radially snap-fitted on the tire, as well as by two series of levers which are connected to the two arms of the U-shaped elements and which represent positioning and spacer elements for the same. According to said proposals of the same Applicant, an essential characteristic of the skid-chain is the easiness of realization and above all the simplicity of the mounting procedure on the wheel tire, which can be carried-out by setting the device on the ground in front of the wheel tire and then advancing on the device with the vehicle.

In this way, the skid-chain automatically fastens on the wheel tire and it is only necessary to connect the first and the last element of the skid-chain to each other.

SUMMARY OF THE INVENTION

According to one embodiment of this invention, new improvements are introduced to obtain a better usefulness with reference both to the fastening operation of the device to the wheels and to the mounting operative phase. More particularly, these improvements allow the skid-chain to assume and maintain the correct position of its elements before and during the mounting operation of the same on the tire, and also when the skid-chain is working, allowing moreover a substantially flat position of the skid-chain elements when not in use.

Furthermore a better resistance to the wearing process of all the device is ensured.

According to the invention, said skid-chain is mainly characterize in that each arm of each U-shaped element carries fastening means to the levers to which the same arm is pivoted, said means being able to removably retain the U-shaped element in at least one position in which it forms with the same levers an angle corresponding to a pre-set mounting angle of the U-shaped element on the wheel-tire.

Accordingly, each U-shaped element is exactly positioned with reference to the tire during the mounting phase and when the device is mounted; wrong positionings of the U-shaped elements and unwanted displacements of the same after the skid-chain has been mounted are completely avoided.

The above and further features of the invention will be now disclosed with reference to an embodiment thereof as shown in the accompanying drawings.

BRIEF DESCRIPTION OF THE DRAWINGS

FIG. 1 is a partial side view of a skid-chain during the mounting operation on a vehicle tire.

FIG. 2 is a partial top view, with parts in section, of said skid-chain according to the invention.

FIG. 3 is a view corresponding to that of FIG. 2, with the components in a detached position.

FIG. 4 is a cross-sectional view along the line IV—IV of FIG. 3, showing one side of one of the levers departing from each U-shaped element.

FIG. 5 is a cross-sectional view along the line V—V of FIG. 3 showing the other side of the levers used in the skid-chain according to the invention.

FIG. 6 is a partially cross-sectioned view showing a possible reciprocal position of the U-element and of the levers.

FIG. 7 is a diagrammatical view of the position of the connecting levers and U-element in operative condition.

FIGS. 8 and 9 are views showing the relative position of the levers, U-element and of means limiting the angular excursion between the same.

DESCRIPTION OF THE PREFERRED EMBODIMENT

The device is formed by a plurality of U-shaped elements 10, which are shaped as described in the former proposal of the same Applicant; these U-elements 10 have, near the ends of each arm, a pivot 12 on which two similar levers 14 and 16 are pivoted; these levers act as connecting and spacing means between the U-elements. The structures of the U-shaped elements and levers is mainly of the type described above by the same Applicant and their construction is preferably of a plastic material. The device permits an automatic mounting thereof on the tire 18, with possible hooking of the first and last elements through an elastically extensible means. The central part of each U-shaped element presents a metal reinforcement, for example shaped as a steel coil 20 buried in the plastic material. The coil cooperates to reduce the wearing of this part and, when the plastic does wear, forms a series of teeth which enhance good traction with the ground.

To warrant the maximum efficiency during the mounting process of the skid-chain, the U-shaped elements 10 must form an angle $\alpha$ with the levers 14 and 16, as indicated in FIG. 1, so that said U-shaped elements 10 take the same position they will have once mounted on the tire-wheel 18.

In order to obtain the above position, the pivot 12 of each U-shaped element presents, at its base part and preferably on a flange 22, two projections 24, for example diametrically opposite, which are able to snap-fit on corresponding seats or notches 26, disposed in an annular rim 28 carried by the adjacent lever 14 which is placed upstream, in the wrapping direction of the tire on the skid-chain with reference to the considered U-shaped element. In other words, the tire reaches the lever 14, during the wrapping phase, before the U-shaped element 10 and lever 16.

With reference to FIG. 7, the notches 26 are slightly elongated in order to create a little clearance allowing the adjustment of the angle between the U-shaped element 10 and lever 14 to accommodate different tire diameters. The two projections 24 of U-shaped element 10 can also snap-fit, without clearance, in other notches or seats 30 (FIG. 7) which define a substantially coplanar position of the levers 14 and of U-shaped elements 10 for a flat disposition of the device when the same is not used, in order to reduce the occupied space.

The two levers 14 and 16 are connected with each other, at pivot 12, through means that reduce the possiblity of relative movement; i.e. the reciprocal rotation angle between the levers. These means are formed by two projections 32, for example on the lever 14, and by corresponding elongated openings 34 of lever 16. The connection between the projections 32 and the elongated seats 34 limits the relative position of levers 14 and 16 between a position of substantial alignment (FIG. 8) and an angle position, as shown in FIG. 9, preventing the two levels from orienting themselves in the other direction, forming an angle relative to the U-shaped element 10. In this way inherent resistance to the stresses to which the elements 10 are subjected, in particular due to obstacles on the ground, is achieved. Finally, the two levers 14 and 16 are fastened to the pivot 12 by means of an elastic washer 36 which is inserted in a groove 38 of pivot 12, said elastic washer 36 being preferably made of a plastic material and housed in a seat 40 at the external eyelet of lever 16. This seat 40 can have the same diameter as the external diameter of the locking washer 36, so that said locking washer cannot be removed once the mounting has been effected.

I claim:

1. An anti-skid device or skid chain for vehicle tires mounted on wheels comprising:
   a plurality of U-shaped elements for radial mounting on said tires, each of said U-shaped elements including a base portion and first and second arm portions;
   a first series of connecting levers each disposed between and pivotally affixed on the ends thereof to adjacent ones of said first arm portions;
   a second series of connecting levers each disposed between and pivotally affixed on the ends thereof to adjacent ones of said second arm portions;
   interlocking means for selectively substantially interlocking said U-shaped elements to said levers of said first and second series of levers in a range of positions such that said first and second arms of said U-shaped elements are disposed within a preselected range of angles relative to said levers of said first and second series; and
   locking means for locking said levers of said first series to adjacent said levers of said first series within a preselected degree of movement, and for locking said levers of said second series to adjacent said levers of said second series within a preselected degree of movement.

2. A device according to claim 1, wherein said interlocking means comprises at least one protrusion and at least one seat for housing said protrusion associated with each of said levers of said first and second sets and the adjacent said U-shaped members.

3. A device according to claim 1, wherein said interlocking means defines two positions for said U-shaped elements, a rest position wherein said first and second arms thereof are in substantial alignment with the adjacent said levers and an operative position wherein said first and second arms each form with the adjacent said levers an angle substantially corresponding to that formed when the device is in said operative position radially disposed on said tire.

4. A device according to claim 3, wherein said range of positions when said interlocking means is in said operative position corresponds to the adjustment necessary for the use of the device on tires having different diameters.

5. A device according to claim 1, wherein said interlocking means acts between each U-shaped element and the adjacent said levers which are positioned upstream relative thereto in the advancing sense of the tire when the device is mounted thereon.

6. A device according to claim 1, wherein said locking means comprises at least one protrusion and at least one seat for housing said protrusion associated with each of said levers of said first and second sets which are adjacent.

7. A device according to claim 1, wherein said first and second arms of each of said U-shaped elements each provide a connecting pivot, eyelets being disposed in each of said levers of said first and second sets for engaging adjacent said pivots, said device further comprising a plurality of snap washers for locking said levers on said pivots when said eyelets are disposed thereabout.

8. A device according to claim 1, wherein selected said eyelets have disposed adjacent thereto in the corresponding said levers a seat for housing said snap washers.

9. A device according to claim 1, wherein at least the base portion of each of said U-shaped elements has disposed therein a reinforcing material.

10. A device according to claim 9, wherein said reinforcing material is formed as a coil.

* * * * *

UNITED STATES PATENT AND TRADEMARK OFFICE
CERTIFICATE OF CORRECTION

PATENT NO. : 4,391,316
DATED : July 5, 1983
INVENTOR(S) : Gianfranco Seggio

It is certified that error appears in the above-identified patent and that said Letters Patent are hereby corrected as shown below:

Column 1, line 6, "realize" should read --realized--.
Column 1, line 7, before "to" insert --according--.
Column 4, line 36, "1" should read --7--.

Signed and Sealed this

Twentieth Day of September 1983

[SEAL]

Attest:

GERALD J. MOSSINGHOFF

Attesting Officer

Commissioner of Patents and Trademarks